Oct. 3, 1939. D. H. REEVES Re. 21,226

ICE TRAY

Original Filed June 17, 1937 3 Sheets-Sheet 1

INVENTOR.
DONALD H. REEVES.

BY
Spencer, Hardman and Fehr.
HIS ATTORNEYS

Oct. 3, 1939. D. H. REEVES Re. 21,226

ICE TRAY

Original Filed June 17, 1937 3 Sheets-Sheet 2

INVENTOR.
DONALD H. REEVES.

BY
Spencer, Hardman and Fehr.
HIS ATTORNEYS.

ICE TRAY

Original Filed June 17, 1937 3 Sheets-Sheet 3

INVENTOR.
DONALD H. REEVES.

BY
Spencer, Hardman and Fehr.
HIS ATTORNEYS.

UNITED STATES PATENT OFFICE 21,226

ICE TRAY

Donald H. Reeves, Dayton, Ohio, assignor to General Motors Corporation, Dayton, Ohio, a corporation of Delaware Original No. 2,154,357, dated April 11, 1939, Serial No. 148,743, June 17, 1937. Application for reissue August 9, 1939, Serial No. 289,328

19 Claims. (Cl. 62—108.5)

This invention relates to ice trays and grid structures therefor employed in mechanically refrigerated household refrigerator cabinets.

One object of my invention is to provide an improved freezing device for liquids including an ice tray and a metallic grid structure therefor which device facilitates the removal of the grid together with ice blocks adhering thereto from the tray and removal of ice blocks from the grid structure without the application of artificial heat thereto.

Another object of my invention is to provide an ice tray with an improved removable grid structure of the type which comprises a plurality of rigid partitioning walls having obstructions thereon and being movable relative to another partitioning wall for breaking a bond between ice blocks in the structure and walls of the structure for effecting release of ice blocks therefrom.

A further object of my invention is to provide an ice tray with an improved grid structure comprising a plurality of rigid corrugated metallic partitioning walls which are movable independently of one another relative to another corrugated metallic partitioning wall to cause ice blocks to act against or between the irregular surfaces of the partitioning walls for moving ice blocks in a plurality of directions to break the bond between the blocks and walls of the grid structure.

In carrying out the foregoing objects still further objects and advantages of my invention reside in details of construction of my improved grid structure and in novel combinations and arrangements of parts thereof which provides for a strong, durable and inexpensive freezing device as will more fully appear in the course of the following description.

Figure 1:
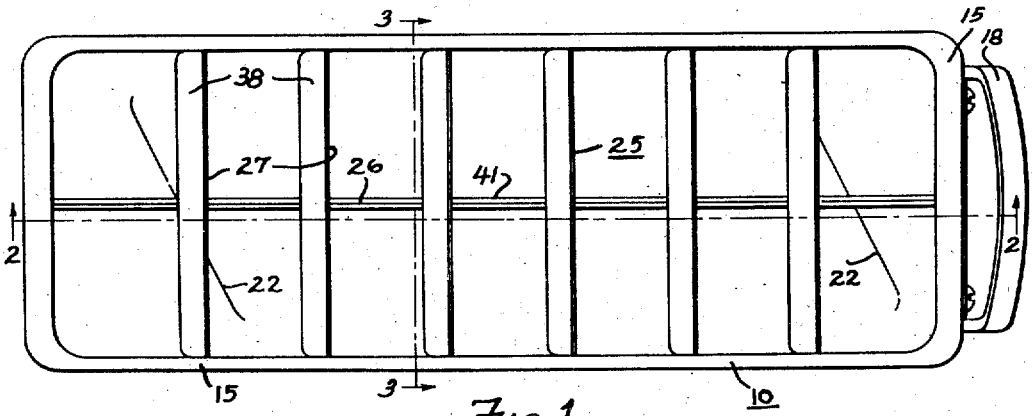
Fig. 1 is a top plan view of a freezing device comprising a tray having a grid structure therein constructed in accordance with my invention.
Figure 2:
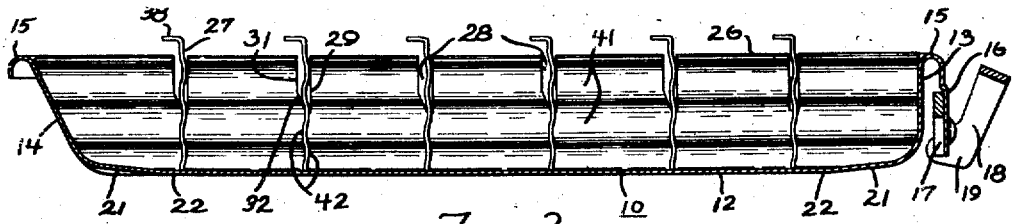
Fig. 2 is a side view of the device shown in Fig. 1 and is taken on the line 2—2 thereof.
Figure 3:
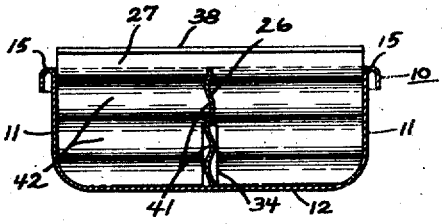
Fig. 3 is a sectional view of the device taken on the line 3—3 of Fig. 1 showing the association of transverse walls of the grid with the longitudinal wall thereof.
Figure 4:
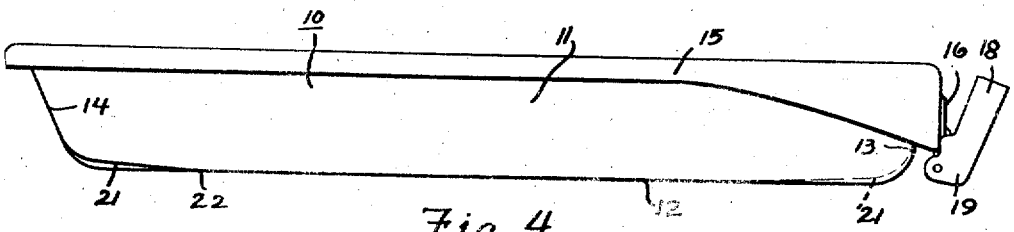
Fig. 4 is a side view of the ice tray shown in Figs. 1, 2 and 3.
Figure 5:
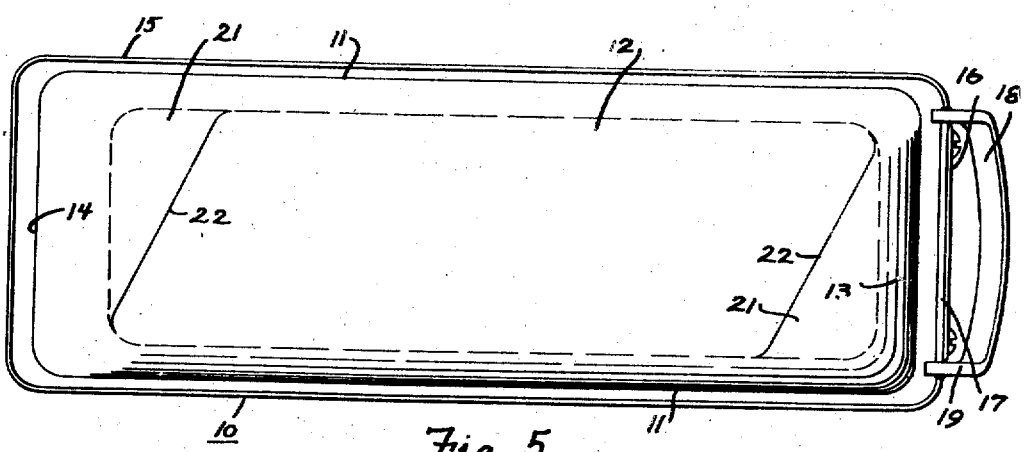
Fig. 5 is a bottom view of the ice tray employed in my freezing device.

Referring to the drawings, for the purpose of illustrating the invention, I have disclosed a metal ice tray 10 having side walls 11 (see Figs. 3, 4 and 5), a bottom wall 12 and opposed end walls 13 and 14. The tray end wall 14 converges outwardly from the bottom to the top of tray 10 and the side walls may also be converged outwardly, if desired. The upright walls 11, 13 and 14 of tray 10 have their upper edge rolled or bent over to form a rim 15 which extends continuously around the top of the tray. A portion of the metal tray 10 is extended downwardly from rim 15, as at 16, at the front end 13 thereof and provides a mounting for a heavy metal piece 17 which has a handle 18 pivotally secured thereto. The handle 18 facilitates placing of tray 10 in or on a cooling element of a refrigerating system and a cam surface 19 formed thereon functions, upon actuating handle 18, to break an ice bond between the tray and its support to permit removal of the tray together with its frozen contents from the cooling element as is well known in the art. It will be noted that the tray 10 has a portion of its bottom wall 12 near each end thereof raised, as at 21, at an angle relative to other portions thereof. This raised or angled bottom wall portion 21 of tray 10 provides a shoulder or fulcrum line 22 which extends transversely across the tray bottom at an angle to the end portion of tray 10. The flat portion of the bent-over top edge at the corner of tray 10 above the widest part of the raised or angled tray bottom portion 21 is adapted to be pressed for a purpose to be presently described.

A metallic grid structure, generally represented by the reference character 25, constituting the improved grid of the present invention is removably disposed in tray 10 and divides the interior thereof into a plurality of open-top molds, cells or compartments. The grid structure 25 comprises rigid metal sections which are movable relative to one another. One section of grid structure 25 is in the form of a vertically disposed longitudinally extending rigid metal partitioning wall member 26. The other section of grid structure 25 is in the form of a plurality of vertically disposed rigid metal partitioning wall members 27 intersecting the longitudinal wall 26 and extending transversely thereacross. The longitudinal grid wall 26 is provided with a plurality of spaced apart slots 28 extending from the top downwardly to about the middle thereof. These slots 28 are formed by a continuously extending vertical wall 29, a short straight vertical wall portion 31 and an angled wall portion 32 extending from the wall portion 31. A slot 34 having straight substantially parallel side walls extends from the bottom edge of each transverse partition 27 upwardly to about the middle thereof (see Fig. 3). The slots 28 and 34 cooperate to permit the plurality of transverse wall members to straddle the longitudinal wall member 26 of the grid structure 25 and to be movably interlocked thereto. It will be noted that slots 28 in the longitudinal wall member 26 receive a web portion of the transverse walls 27 and that slots 34 in the transverse walls 27 receive a web portion of the longitudinal wall 26 and that such reception completes the grid to form a rigid unitary removable structure. It will also be noted that the transverse grid wall members 27 extend above the top of the longitudinal grid wall member 26 and have their upper ends bent over to form lips 38 for a purpose to be presently described. The longitudinal grid wall section or member 26 is provided with longitudinally extending corrugations 41 and the transverse grid walls or sections 27 are each provided with a plurality of corrugations 42 for a purpose hereinafter described. The slots 28 and 34 obviously are of such width as to receive and engage the raised parts of the horizontally extending corrugations 41 and 42 provided on grid wall partitioning members 26 and 27 to cause these members to be firmly interlocked and held in substantially vertical positions relative to one another. The tapered or angled wall surface portion of slots 28 provided in wall member 26 insures that the raised parts of corrugations 42 provided in wall members 27 will be forced toward and into abutting engagement with the continuous vertical wall 29 of slots 28 when members 27 are lowered into straddling position over member 26. The horizontally extending corrugations 41 and 42 provided in grid members or sections 26 and 27 respectively form camming surfaces or obstructions along the sides of the members and provide the grid structure with irregular wall surfaces which have a function that will become apparent in the description of the operation of the device.

Figure 6:
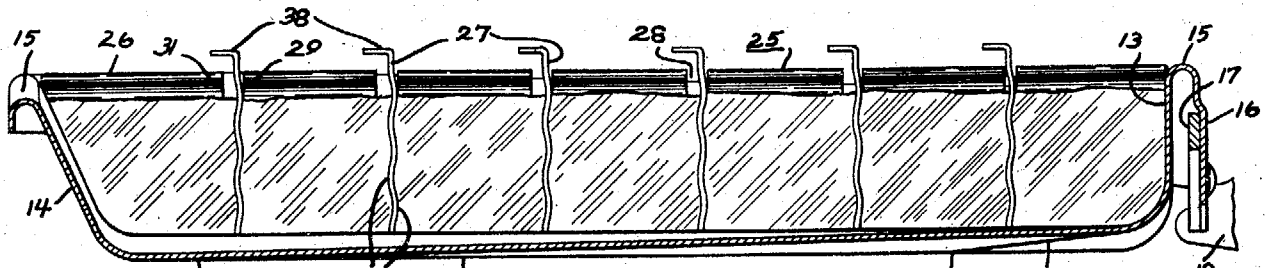
Fig. 6 is a longitudinal sectional view showing the tray flexed and disclosing the grid structure and ice blocks adhering thereto released from the tray.

The tray 10 after having been filled with water and having the grid structure 25 placed therein is positioned in or on a freezing portion of a cooling element or evaporator of a refrigerating system to cause freezing of the water into a plurality of blocks. To remove the grid structure 25 together with ice blocks adhering thereto from tray 10, after the tray has been released and removed from the freezing support of the evaporator, the tray 10 is placed upon a flat support such as a table or ledge and force is applied at the top corners thereof located remote from the shoulders or fulcrumed lines 22. Since the tray is constructed of relatively thin metal it is somewhat flexible and the downward force applied to the ends thereof, as described, is transmitted to the fulcrum lines or shoulders 22 and causes flexure or twisting of the tray, due to the angled disposition of the fulcrum lines 22, into the position illustrated in Fig. 6 of the drawings. Twisting of the tray as illustrated in Fig. 6 breaks the bond between the ice in tray 10 and the inner surfaces of the tray walls. The grid structure 25 together with ice blocks adhering thereto can then be readily removed from tray 10 by inverting the tray to thereby permit harvesting of the ice blocks from grid structure 25.

Figure 8:
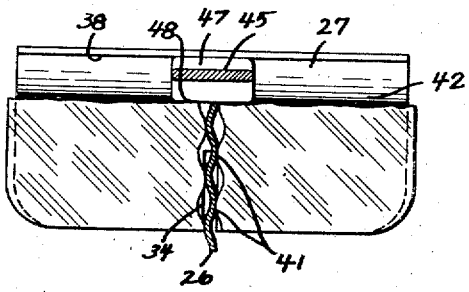
Fig. 8 is a sectional view taken on the line 8—8 of Fig. 6 illustrating the broken ice bond and showing the ice blocks moved away from the wall of the grid.
Figure 7:
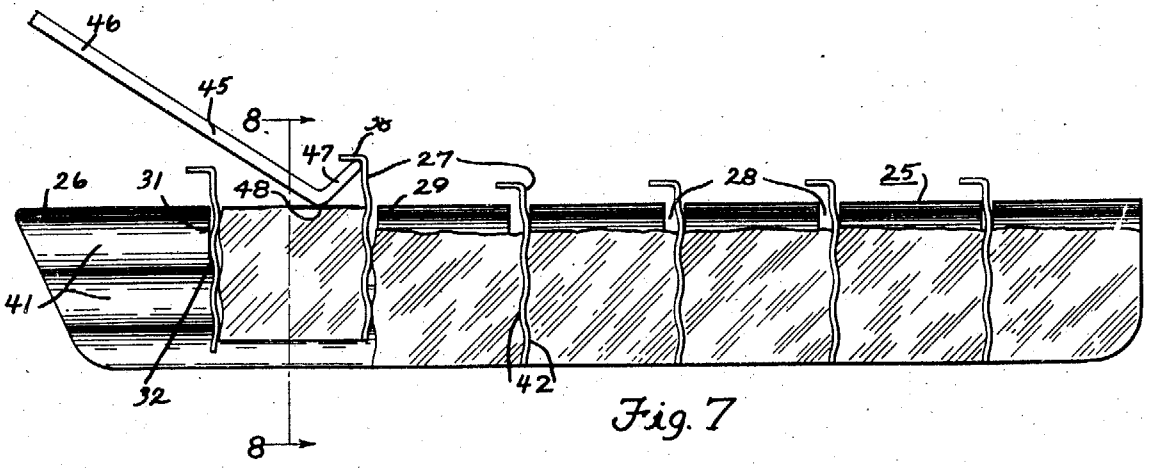
Fig. 7 is a view of the grid structure removed from the tray and showing certain walls of the grid moved relative to another wall thereof for breaking an ice bond between the ice blocks and the grid walls.

After removal of the grid structure 25 and ice blocks adhering thereto from tray 10 the transverse grid walls 27 can then be moved relative to the longitudinal grid wall 26. Therefore I provide a prying tool in the form of a lever 45 (see Fig. 7) having a handle portion 46 and a finger end 47, formed by a bent fulcrum portion 48, is provided for this purpose. In Fig. 7 of the drawings I have shown the one end transverse grid wall 27 as having already been moved upwardly of the longitudinal grid wall 26 to break the bond between the corner ice blocks and the grid walls to thereby release the corner ice blocks from the grid structure. Also in Fig. 7 I show the next to the end transverse grid wall 27 as having been moved upwardly of the longitudinal grid 26 by the tool or lever 45. To independently move the grid walls 27 relative to wall 26 as shown, to obtain the desired number of ice cubes or blocks, the tool 45 is placed upon the grid structure 25 with its bent fulcrum point 48 resting upon the top edge of longitudinal wall 26 and with its finger or camming end 47 positioned under the bent-over lip portion 38 of one of the transverse walls 27. The handle end 46 of tool 45 is moved downwardly thus causing the bent part 48 thereof to fulcrum upon the top of longitudinal grid member 26 to raise the finger end 47 into the position illustrated in Figs. 7 and 8 of the drawings. The force applied to lever or tool 45 for creating upward movement of the transverse grid member relative to the longitudinal grid member causes the convex and concave portions of corrugations 41 and 42 provided in the grid wall partitions 26 and 27 respectively to act as cam means against the ice blocks and this camming action moves the ice blocks relative to walls of the grid structure to release same therefrom to permit easy removal of the ice blocks by the hand of the operator or by ice tongs. By referring to Figs. 7 and 8 it will be noted that the camming action of the corrugated grid walls against the ice blocks causes the ice blocks to move in a plurality of directions or upwardly and outwardly relative to the longitudinal grid wall 26 and lengthwise along the transverse grid walls 27. Thus the bond between all the walls of the ice block compartments and the ice blocks is broken to permit the removal of ice from the grid structure.

While I have disclosed the transverse grid partitions or walls 27 of the structure 25 as being entirely separable from the longitudinal partition or wall 26 it may be desirable to secure the walls 27 to wall 26 and permit only the movement therebetween as shown and described to effect the ice block releasing action. It is also to be understood that while I have corrugated the rigid grid walls or sections of the structure 25 to provide irregular wall surfaces therefor it is well within the realm of my invention to provide other forms of obstructions or camming surfaces on the grid walls to obtain the camming action desired. I have disclosed the transverse grid walls 27 as being independently moved relative to the longitudinal grid wall 26 but suitable arrangements may be provided for moving the walls 27 progressively by a single means from one end to the other end of the grid structure while still incorporating the principle of my invention of corrugating both the longitudinal and transverse partition walls of the grid structure.

From the foregoing it will be seen that I have provided an improved combination to thereby eliminate the necessity of running water over the tray to release the grid and ice therefrom and of applying artificial heat to the grid structure to effect release of ice blocks therefrom. My improved and novel ice tray grid structure is of simple construction, low manufacturing cost, strong and durable, capable of being operated over a long period of time without damage thereto and with a minimum of force. The device disclosed is constructed entirely of metal to thereby retain the fast freezing characteristics of metal tray and grid combinations. In my improved grid structure any predetermined number of ice blocks may be released therefrom without releasing other ice blocks and after removal of the desired ice blocks from the grid the grid together with the other ice blocks remaining therein may be replaced in the tray and the tray again placed upon its support in or on a cooling element.

While the form of embodiment of the invention as herein disclosed, constitutes a preferred form, it is to be understood that other forms might be adopted, all coming within the scope of the claims which follow.

What is claimed is as follows:

1. A grid structure for an ice tray comprising a plurality of sections, one of said sections being in the form of a longitudinal partitioning wall and the other of said sections being in the form of a partitioning wall extending transversely to said longitudinal wall, one of said sections of said grid structure being movable relative to the other thereof, obstructions on each of said sections forming irregular wall surfaces therefor, and the obstructions on one wall section cooperating with the obstructions on said other wall section to move ice in a plurality of directions upon moving said grid wall sections relative to one another.

2. A grid structure for an ice tray comprising a plurality of sections, one of said sections being in the form of a longitudinal partitioning wall and the other of said sections being in the form of a partitioning wall extending transversely to said longitudinal wall, said transverse partitioning wall section of said grid structure being movable upwardly of said longitudinal partitioning wall section thereof, obstructions on each of said grid sections forming irregular wall surfaces therefor, and the obstructions on one wall section cooperating with the obstructions on said other wall section to move ice upwardly of said longitudinal wall and outwardly thereof along said transverse wall upon moving the transverse wall upwardly of the longitudinal wall.

3. A grid structure for an ice tray comprising a plurality of sections, one of said sections being in the form of a longitudinal partitioning wall and the other of said sections being in the form of a partitioning wall extending transversely to said longitudinal wall, said partitioning walls each being corrugated to provide same with irregular wall surfaces, one of said sections of said grid structure being movable relative to the other thereof, and the corrugations in one wall section cooperating with the corrugations in the other of said wall sections to move ice in a plurality of directions upon moving said grid wall sections relative to one another.

4. A grid structure for an ice tray comprising a plurality of sections, one of said sections being in the form of a longitudinal partitioning wall and the other of said sections being in the form of a partitioning wall extending transversely to said longitudinal wall, said partitioning walls each being corrugated to provide same with irregular wall surfaces, said transverse partitioning wall section of said grid structure being movable upwardly of said longitudinal partitioning wall section thereof, and the corrugations in one wall section cooperating with the corrugations in the other of said wall sections to move ice upwardly of said longitudinal wall and outwardly thereof along said transverse wall upon moving the transverse wall upwardly of the longitudinal wall.

5. A grid structure for an ice tray comprising a plurality of sections, one of said sections being in the form of a single longitudinal partitioning wall and the other of said sections being in the form of a plurality of partitioning walls carried by said longitudinal wall and extending transversely thereto, obstructions on each of said partitioning walls forming irregular wall surfaces therefor, said transverse partitioning wall sections of said grid structure being independently movable relative to the longitudinal partitioning wall section thereof, and the obstructions on one wall section cooperating with the obstructions on said other wall section to move ice in a plurality of directions upon moving said grid transverse wall sections relative to the longitudinal grid wall section.

6. A grid structure for an ice tray comprising a plurality of sections, one of said sections being in the form of a single longitudinal partitioning wall and the other of said sections being in the form of a plurality of partitioning walls carried by said longitudinal wall and extending transversely thereto, obstructions on each of said partitioning walls forming irregular wall surfaces therefor, each of said transverse partitioning wall sections of said grid structure being independently movable upwardly of the single longitudinal partitioning wall section thereof, and the obstructions on one wall section cooperating with the obstructions on said other wall sections to move ice upwardly of said single longitudinal wall and outwardly thereof along said transverse walls upon moving one of the transverse walls upwardly of the single longitudinal wall.

7. A grid structure for an ice tray comprising a plurality of sections, one of said sections being in the form of a single longitudinal partitioning wall and the other of said sections being in the form of a plurality of partitioning walls loosely carried by said longitudinal wall and extending transversely thereto, said partitioning walls each being corrugated to provide same with irregular wall surfaces, said transverse partitioning wall sections of said grid structure being independently movable relative to the longitudinal partitioning wall section thereof, and the corrugations in one wall section cooperating with the corrugations in the other wall section to move ice in a plurality of directions upon moving said grid transverse wall sections relative to the longitudinal grid wall section.

8. A grid structure for an ice tray comprising a plurality of sections, one of said sections being in the form of a single longitudinal partitioning wall and the other of said sections being in the form of a plurality of partitioning walls loosely carried by said longitudinal wall and extending transversely thereto, said partitioning walls each being corrugated to provide same with irregular wall surfaces, each of said transverse partitioning wall sections of said grid structure being independently movable upwardly of the single longitudinal partitioning wall section thereof, and the corrugations in one wall section cooperating with the corrugations in the other wall sections to move ice upwardly of said single longitudinal wall and outwardly thereof along said transverse walls upon moving one of the transverse walls upwardly of the single longitudinal wall.

9. A grid structure for an ice tray comprising a plurality of sections, one of said sections being in the form of a single longitudinal partitioning wall and the other of said sections being in the form of a plurality of partitioning walls loosely carried by said longitudinal wall and extending transversely thereto, said partitioning walls each being corrugated to provide same with irregular wall surfaces, said corrugations extending horizontally along said partitioning walls substantially throughout the lengths thereof, each of said transverse partitioning wall sections of said grid structure being independently movable upwardly of the single longitudinal partitioning wall section thereof, and the corrugations in one wall section cooperating with the corrugations in the other wall sections to move ice upwardly of said single longitudinal wall and outwardly thereof along said transverse walls upon moving one of the transverse walls upwardly of the single longitudinal wall.

10. A grid structure for an ice tray comprising a plurality of sections, one of said sections being in the form of a rigid metallic longitudinal partitioning wall and the other of said sections being in the form of a rigid metallic partitioning wall carried by said longitudinal wall in intersecting engagement therewith and extending transversely thereto, said rigid partitioning walls each being corrugated to provide same with irregular wall surfaces, said corrugations extending horizontally along said walls substantially throughout the lengths thereof, one of said sections of said grid structure being movable relative to the other thereof, and the corrugations in one rigid wall section cooperating with the corrugations in the other of said rigid wall sections to move ice in a plurality of directions upon moving said grid wall sections relative to one another.

11. A grid structure for an ice tray comprising a plurality of sections, one of said sections being in the form of a single rigid metallic longitudinal partitioning wall and the other of said sections being in the form of a plurality of rigid metallic partitioning walls carried by said single longitudinal wall in spaced apart relation and extending transversely thereto, each of said rigid transverse partitioning walls being corrugated to provide same with irregular wall surfaces, said corrugations extending horizontally along said transverse walls substantially throughout the lengths thereof, each of said transverse grid wall sections being movable relative to said single longitudinal grid wall section, and the corrugations in said transverse grid wall causing movement of ice relative to one of said grid wall sections upon moving one of said transverse grid walls relative to said single longitudinal wall.

12. The combination with an ice tray of a partition member removably arranged along the longitudinal axis thereof and a second partition member extending transversely of and cooperating with the side walls of the tray and with said longitudinal partition member to form a pair of ice cube compartments, the transverse partition member being formed with a portion flanged at the top thereof to receive a lifting force, and a second portion arranged to provide an obstruction to relative straight line movement between the ice cubes and the transverse partition and thereby resolve the first mentioned force into components some of which tends to break the bond between the ice cube and the partition elements.

13. The combination with an ice tray of a partition member removably arranged along the longitudinal axis thereof and a second partition member extending transversely of and cooperating with the side walls of the tray and with said longitudinal partition member to form a pair of ice cube compartments, the transverse partition member being formed with a flanged portion at the top thereof to receive a lifting force, a second portion of said transverse member being formed with indentations arranged to provide an obstruction to relative straight line movement between the ice cubes and the transverse partition and thereby resolve the first mentioned force into components some of which tend to break the bond between the ice cubes and the partition elements.

14. The combination with an ice tray of a grid structure removably disposed therein, said grid structure comprising a partition member arranged along a longitudinal axis of the tray and a plurality of partition members extending transversely of and in spaced apart relation along the length of said longitudinal partition, said transverse partitions cooperating with the longitudinal partition of said grid structure and with walls of the tray to form rows of ice block compartments, said transverse partition members being provided with means adapted to receive a lifting force, and means on said transverse partition members providing an obstruction to relative straight line movement thereof between ice blocks contacting same whereby, upon application of said force to a transverse partition member, said member is elevated relative to other members and the bond between certain ice blocks and the partition members is broken.

15. The combination with an ice tray structure of a grid structure removably disposed therein, said grid structure comprising a partition arranged along a longitudinal axis of the tray and a plurality of partitioning members extending transversely of and in spaced apart relation along the length of said longitudinal partition, said transverse partitioning members cooperating with the longitudinal partition of said grid structure and with walls of the tray structure to form rows of ice block compartments, said transverse partitioning members being provided with means adapted to receive a lifting force, means on said transverse partitioning members providing an obstruction to relative straight line movement thereof between ice blocks contacting same, and a lever adapted to be associated with one of said structures and having a part engaging said first named means on one of said transverse partitioning members and another part thereof abutting and fulcruming about a portion of one of said structures whereby, upon application of force to said one transverse partitioning member by said lever, said one transverse partitioning member is moved independently of and relative to other of said transverse partitioning members to cause the obstruction thereon to move ice blocks adjacent thereto relative to other ice blocks bonded to said grid structure.

16. In a freezing tray, a container pan and a grid therefor serving to divide the frozen contents into ice blocks, said grid comprising: a main longitudinal dividing wall having a series of notches therein spaced along its length, a series of cross walls extending across said main wall and loosely arranged in said notches in such manner that each cross wall may be individually and independently moved relative to said main wall to facilitate the removal of the frozen ice blocks from said grid, and a detached prying tool manually actuatable at successive separate and independent operations to force only one cross wall at each operation thereof to move relative to said main wall whereby to facilitate the removal from said grid of two ice blocks at a time.

17. In a freezing tray, a container pan and a grid therefor serving to divide the frozen contents into ice blocks, said grid comprising: a main longitudinal dividing wall having a series of notches therein spaced along its length, a series of cross walls extending across said main wall and loosely arranged in said notches in such manner that each cross may be individually and independently moved relative to said main wall to facilitate the removal of the frozen ice blocks from said grid, and a detached prying tool adapted to be individually applied at separate operations thereof to each of said cross walls so as to react between each cross wall and that portion of the main wall which is adjacent thereto and thereby move said cross walls relative to said main wall one at a time and with a greatly multiplied force.

18. In a freezing tray, a container pan and a grid therefor serving to divide the frozen contents into ice blocks, said grid comprising a series of relatively movable partitioning portions, each portion being independently movable relative to other partitioning portions to facilitate the removal of the frozen ice blocks from said grid, and a detached prying tool manually actuatable at successive separate and independent operations to force only one of said partitioning portions of said grid to move relative to the other grid portions at each operation thereof to loosen relatively small groups of ice blocks from said grid at a time.

19. In a freezing tray, a container pan and a grid therefor serving to divide the frozen contents into ice blocks, said grid comprising a series of relatively movable partitioning portions, each portion being independently movable relative to other partitioning portions to facilitate the removal of the frozen ice blocks from said grid, and a detached prying tool manually actuatable at successive separate and independent operations to pry one of said partitioning portions and at least two adjacent ice blocks loose from the remaining solid frozen unit of grid and ice blocks, said prying tool being moved to a new position at each successive operation thereof so as to always fulcrum closely adjacent the particular grid portion being pried loose at that operation.

DONALD H. REEVES.